United States Patent
Hamza

(10) Patent No.: US 7,099,796 B2
(45) Date of Patent: Aug. 29, 2006

(54) MULTI-SENSOR INFORMATION FUSION TECHNIQUE

(75) Inventor: Ridha M Hamza, Inver Grove Heights, MN (US)

(73) Assignee: Honeywell International Inc., Morristown, NJ (US)

(*) Notice: Subject to any disclaimer, the term of this patent is extended or adjusted under 35 U.S.C. 154(b) by 191 days.

(21) Appl. No.: 10/014,626

(22) Filed: Oct. 22, 2001

(65) Prior Publication Data
US 2003/0078754 A1    Apr. 24, 2003

(51) Int. Cl.
G01C 17/00    (2006.01)

(52) U.S. Cl. .................................. 702/150

(58) Field of Classification Search ........... 702/150, 702/109, 93; 706/1, 52, 27, 16; 725/76; 342/29, 33, 463, 357; 340/539; 701/208, 701/96, 207, 23, 26, 47, 120; 700/51; 382/100
See application file for complete search history.

(56) References Cited

U.S. PATENT DOCUMENTS

| | | | | |
|---|---|---|---|---|
| 5,252,982 A | * | 10/1993 | Frei | 342/357.03 |
| 5,311,194 A | * | 5/1994 | Brown | 342/357.06 |
| 5,483,241 A | * | 1/1996 | Waineo et al. | 342/29 |
| 5,510,990 A | * | 4/1996 | Hibino et al. | 701/96 |
| 5,572,218 A | * | 11/1996 | Cohen et al. | 342/357.06 |
| 5,661,486 A | * | 8/1997 | Faivre et al. | 342/33 |
| 5,757,314 A | * | 5/1998 | Gounon et al. | 342/357.08 |
| 5,850,625 A | * | 12/1998 | Maren et al. | 702/93 |
| 5,890,085 A | * | 3/1999 | Corrado et al. | 701/47 |
| 5,940,523 A | * | 8/1999 | Cornman et al. | 382/100 |
| 5,961,571 A | * | 10/1999 | Gorr et al. | 701/207 |
| 5,987,591 A | * | 11/1999 | Jyumonji | 700/259 |
| 6,084,510 A | * | 7/2000 | Lemelson et al. | 340/539 |
| 6,324,532 B1 | * | 11/2001 | Spence et al. | 706/27 |
| 6,445,983 B1 | * | 9/2002 | Dickson et al. | 701/23 |
| 6,456,239 B1 | * | 9/2002 | Werb et al. | 342/463 |
| 6,499,025 B1 | * | 12/2002 | Horvitz et al. | 706/52 |
| 2002/0026249 A1 | * | 2/2002 | Rasmussen et al. | 700/51 |
| 2002/0026431 A1 | * | 2/2002 | Pedersen et al. | 706/1 |
| 2002/0120391 A1 | * | 8/2002 | Nehls | 701/120 |
| 2002/0144272 A1 | * | 10/2002 | McLain et al. | 725/76 |
| 2002/0165837 A1 | * | 11/2002 | Zhang et al. | 706/16 |

FOREIGN PATENT DOCUMENTS

EP    0883 873 B1    2/1997

OTHER PUBLICATIONS

Adam et al, "Fusion of Fixation and Odometry for Vehicle Navigation", *IEEE Transactions On Systems, Man, and Cybernetics—Part A: Systems and Humans*, 29(6):593-595 (Nov. 1999).

(Continued)

Primary Examiner—Bryan Bui
Assistant Examiner—Aditya Bhat
(74) Attorney, Agent, or Firm—Kris T. Fredrick

(57) ABSTRACT

The invention is a method and system for aggregating quantitative data and qualitative information from a plurality of sensors, each sensor having a plurality of associated sensor uncertainties, to determine the most likely position of an object and an associated probability distribution for the most likely position of the object. Statistical analysis and probability theory is preferably used to more accurately locate the object and to minimize the range of the associated probability distribution. The method and system are applicable for locating and tracking a plurality of objects.

7 Claims, 4 Drawing Sheets

OTHER PUBLICATIONS

Dohler et al, "Image Data Fusion for Enhanced Situation Awareness", *RTO Meeeting Proceedings 3: The Application of Information Technologies (Computer Science) to Mission Systems*, pp. 1/1-12 (Nov. 1998).

Flight Explorer—The world's leading, real-time aircraft situation display (ASD), http://www.flightexplorer.com/flightexplorer.htm.

Fuerst et al, "Vision based navigation system for autonomous aircraft", *Robotics and Autonomous Systems*, 28(2): 173-189 (1999).

Gorton et al, Performance and Situation Awareness Benefits of Explanatory Interfaces for Cockpit Decision Support, *Proceedings of the Human Factors and Ergonomics Society*, 2 p. 1600 (1998).

Gustafson, "Modern data visualization for tactical intelligence", *Proceedings of SPIE—The International Society for Optical Engineering*, 3751: 72-75 (1999).

Hecker et al, "Enhanced vision systems: results of simulation and operational tests", *Part of the SPIE Conference on Enhanced and Synthetic Vision 1998*, 3364 pp. 11-19 (Apr. 1998).

Marengoni et al, "Ascender II a visual framework for 3D reconstruction", *Computer Vision Systems*, pp. 469-488 (1999).

Mayer, H., "Automatic object extraction from aerial imagery—a survey focusing on buildings", *Computer Vision and Image Understanding*, 74(2): 138-149 (May 1999).

Nelson et al, "Sensor fusion for intelligent alarm analysis", *Annual Meeting of the Institute of Nuclear Materials Management*, pp. 717-723 (1996).

Nelson, J. et al, "Integrating geometry with NDE data", *International SAMPE Symposium and Exhibition (Proceedings)*, 44(I):809-819 (1999).

Nikolic et al, "Multisensory Feedback in Support of Pilot-Automation Coordination: The Case of Uncommended Mode Transitions", *Proceedings of the Human Factors and Ergonomics Society* 1 pp. 239-243 (1998).

No Author, *Sensor Data Fusion and Integration of the Human Element*, iii 236pp (1999).

Solinsky, "KBIP Geolocation Algorithm", *RSC Report*, pp. 1-14 (Nov. 5, 1998).

Uhlmann et al, "NASA Mars rover: a testbed for evaluation applications of covariance intersection" *Proceedings of SPIE—The International Society for Optical Engineering*, 3693: 140-149 (1999).

Watts et al, "Fusion and Display of Tactical Information Within Battlefield Helicopters", *Sensor Data Fusion and Integration or the Human Element*, iii pp. 17/1-5 (1999).

Wieler et al, "Integrated Terminal Weather System (ITWS)—A System Perspective", *Conference on Radar Meteorology*, pp. 71-73 (1999).

Zhang, Joan-Guo, "High-speed Avionic Optical Fiber CDMA Networks", *IEEE Aerospace and Electronic Systems Magazine*, 14(6): 15-21 (1999).

* cited by examiner

MULTI-SENSOR INFORMATION FUSION TECHNIQUE

FIELD OF THE INVENTION

The present invention is related generally to a method and system for locating the position of, and tracking, objects. More specifically, the invention is directed towards a method and system for locating and tracking airborne aircraft.

BACKGROUND OF THE INVENTION

In recent years, there has been a steady increase in the number of airplanes in service at any one time. With this rise in the number of aircraft, there has been an increased interest in minimizing the separation distance between airplanes without compromising safety. Additionally, there is a trend towards autonomous or free-flight planning wherein the pilot, while en route, will be permitted to change the aircraft's flight plan. In order to accomplish these and other objectives, it is desirable for air traffic controllers and pilots to know, as precisely as possible, the location of all airplanes relative to one another.

Typically, several sensor systems including radar systems, beacon systems, etc., are employed for surveillance and tracking, along with current position reports from pilots, estimations based on flight plans and vehicle speed, etc. These methods are imprecise and limited in that they individually report different approximate positions for the same object such as an airborne aircraft, and a margin of error must be applied to each reported location. These differences in the reported locations and errors arise because of the performance and operational characteristics of the sensors, and the prevailing environmental conditions. For example, the reliability of information from a radar system, no matter how sophisticated, might vary greatly with atmospheric conditions, most likely being more precise under clear and calm conditions than under stormy conditions (rain, snow, hail, etc.). The margin of error, when applied to each quantitative and qualitative observation, results in the tracking system applying a larger than desirable separation zone around the best estimated aircraft location. This separation zone, or uncertainty zone, is typically increased during foul weather in order to compensate for the performance characteristics of the sensors and the less than optimal reliability and accuracy of the data.

Such existing methods and systems for locating an object are generally directed towards guiding an aircraft onto the runway when landing. Other systems, such as the Traffic Alert and Collision Avoidance System (TCAS) issue alerts and evasive commands only after the safety zone has been breached. The TCAS relies on data transmitted by a transponder located on an aircraft. Since all aircraft are not mandated to have a transponder, the system can not be relied upon for maintaining minimum and safe separation zones. Other current methods collect data from several sources, and then report the location information either by applying a weighted average to the data, or relaying the data from a single sensor, or transmitting all information as separate attributes (e.g., speed, direction, altitude, etc.).

Therefore, there exists a need for a method and apparatus to collect all available quantitative and qualitative data from the numerous sources and aggregate these with prior knowledge of their performance characteristics to more accurately locate and track an object such as an airborne aircraft.

SUMMARY OF THE INVENTION

The disclosed invention is a method and apparatus for aggregating, or fusing, information from several sources into one or more reports which more accurately locates the position of an object such as an airborne aircraft and tracks its path. In the preferred embodiment of the present invention, statistical analysis and probability theory are preferably used to combine quantitative data (i.e., numeric data from sensors) and qualitative information, e.g., symbolic, weather conditions, reliability of source, assumptions, etc., to derive the object's position with a higher level of confidence than can be attained using one or more sensors either separately or with the combination methods and systems of the prior art. This accuracy, achievable with the present invention, is preferably attained by segmenting all possible attributes reported by the different sensors and applying one or more statistical operators to derive the intersection of all reports to generate a value indicative of the most likely location of the object.

DETAILED DESCRIPTION OF THE PREFERRED EMBODIMENTS

Figure 1:
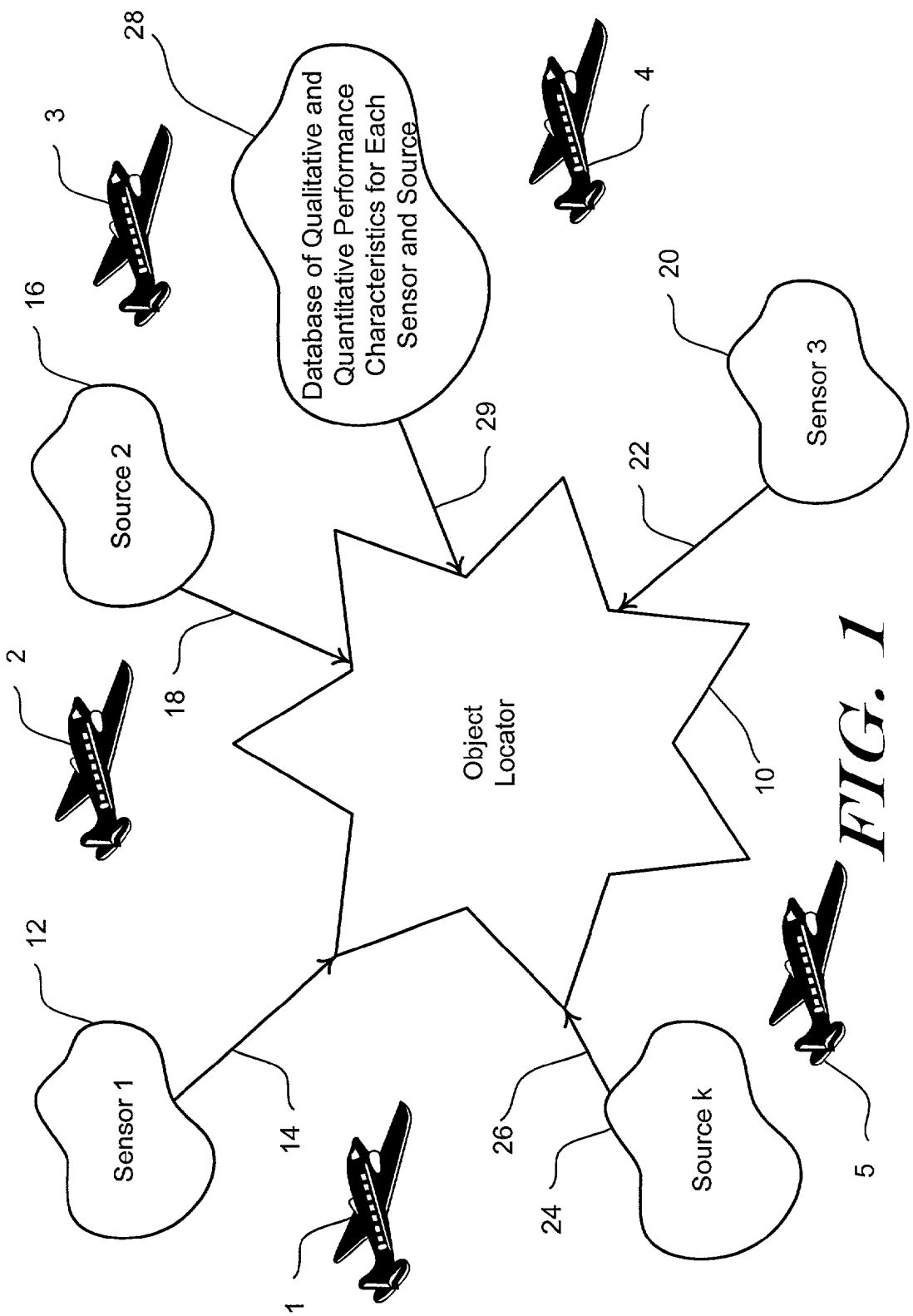
FIG. 1 is a conceptual drawing illustrating an object locator in accordance with the present invention.

FIG. 1 is a conceptual drawing illustrating an object locator 10 in accordance with the present invention. Object locator 10 preferably fuses (or aggregates) inputs from a plurality of sensors and/or sources 12, 16, 20, and 24 for locating and tracking the position of an object such as an airborne aircraft. In the illustrative embodiment, sensors 12 and 20 may provide quantitative data and sources 16 and 24 may provide qualitative information. Hereinafter, the term sensor is used to collectively represent sensors and/or sources. The four sensors 12, 16, 20, and 24 shown in FIG. 1 are for illustration purposes only, and any number of sensors can be accommodated by the present invention. Sensors 12, 16, 20, and 24 scan for objects 1, 2, 3, 4, and 5, and provide information regarding the estimated positions of these objects to the object locator 10 along paths 14, 18, 22, and 26, respectively. The five objects 1, 2, 3, 4, and 5 shown in FIG. 1 are for illustration purposes only, and any number of objects can be accommodated by the present invention.

Information regarding the qualitative and quantitative performance characteristics of each sensor (and/or source) is also available to object locator 10. Typical sensor performance characteristics include information on the sensor's accuracy, reliability, effect of environmental conditions (e.g., temperature, pressure, precipitation, etc.), degradation with age, etc. This information may be stored in a database 28 accessible by the object locator 10 along path 29. Alternately, each sensor 12, 16, 20, and 24 may transmit its performance characteristic along with the estimated positions of the objects on its respective path 14, 18, 22, and 26 to object locator 10. Object locator 10 preferably uses statistical methods to conduct a probability analysis on the data to generate a value indicative of the most likely location of the object.

Figure 2:
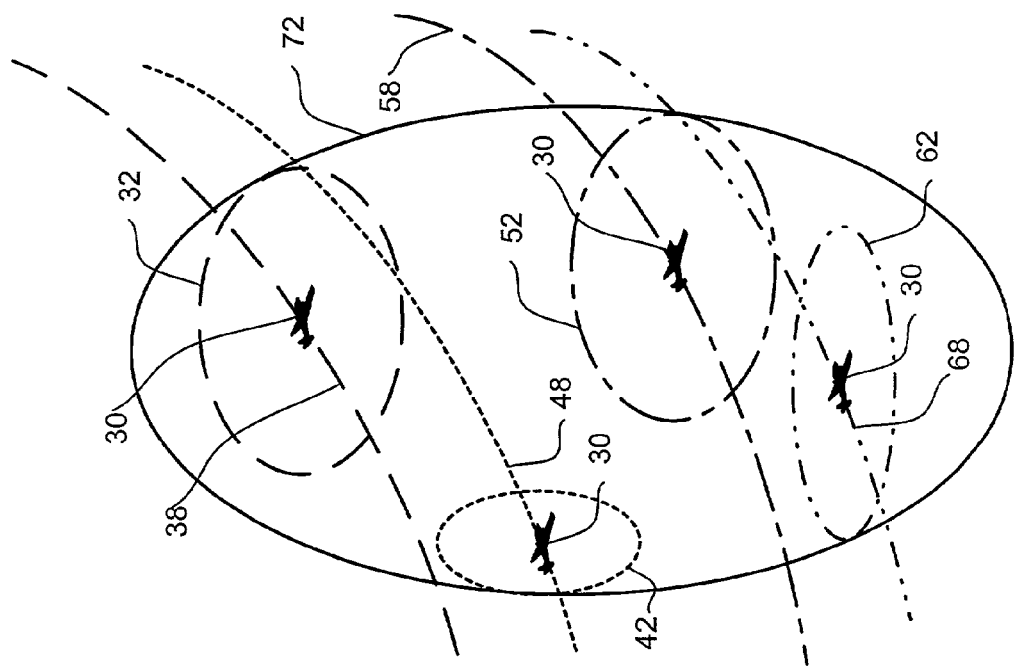
FIG. 2 shows the several conflicting position reports provided by various sensors.

Since each sensor may have its own unique performance characteristic and in many cases may be located distant from other sensors, object locator 10 may receive conflicting reports on the estimated position of the same identified object. Additionally, each reported position will likely have a level of uncertainty associated with it reflective of the performance characteristics of the corresponding sensor or sensors. This is illustrated in FIG. 2 wherein the four sensors of FIG. 1 are shown reporting four distinctly different and conflicting positions and uncertainty levels for the same object 30. For instance, one of the four sensors is shown as reporting object 30 traversing along path 38 and located at the center of the sensor's uncertainty boundary 32. Concurrently, a second sensor is shown as reporting object 30 traversing along path 48 and positioned at the center of the sensor's uncertainty boundary 42. A third sensor is shown as reporting object 30 traversing along path 58 and located at the center of the sensor's uncertainty boundary 52. Finally, a fourth sensor is shown as reporting object 30 traversing along path 68 and positioned at the center of the sensor's uncertainty boundary 62.

Under the prior art method, the reported locations and uncertainty boundaries may be aggregated using weighted averaging technique and object 30 may be reported as being located at the center of uncertainty boundary 72. Subsequently, a safety zone equivalent in size to uncertainty boundary 72 may be designated around object 30, and no other object is permitted to encroach into this region. Uncertainty boundary 72 encompasses, and hence may be relatively larger than, the individual sensor uncertainty boundaries 32, 42, 52, and 62. Additionally, data from only some of the available sensors may be taken into consideration. Furthermore, only a small subset of all the data available from the sensors under consideration may be analyzed. As discussed hereinafter, these shortcomings of the prior art may be reduced or eliminated in the preferred embodiment of the present invention.

Figure 3:
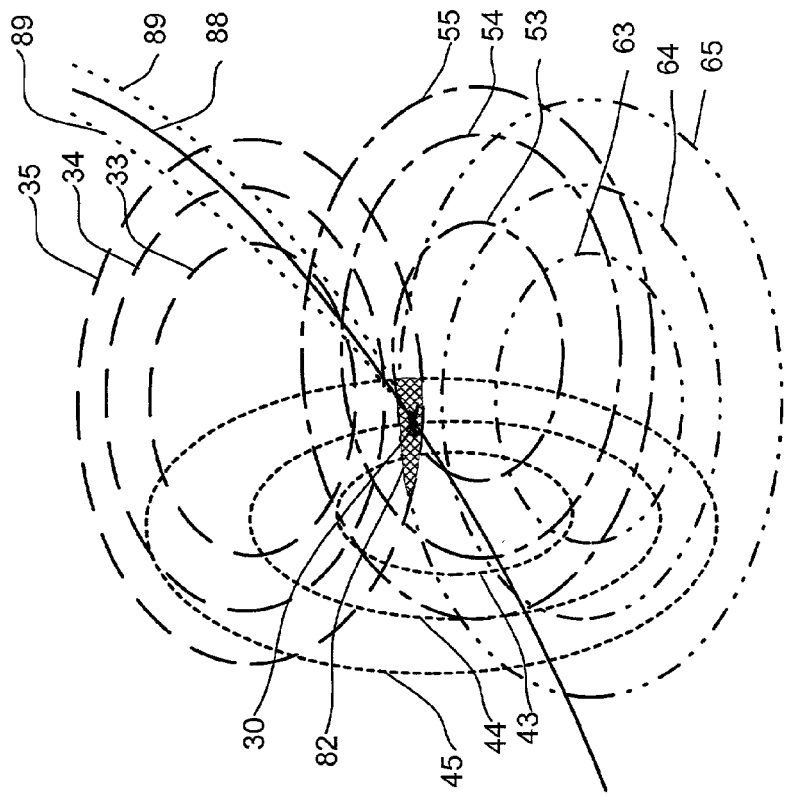
FIG. 3 is a schematic diagram showing an aggregated position report generated by an illustrative embodiment of the present invention.

FIG. 3 is a schematic representation of a most likely position of object 30 as derived by an illustrative embodiment of the present invention. Details for locating and tracking the object are presented later in discussions related to FIGS. 4 and 5. In general, the preferred embodiment divides the uncertainty boundary of each sensor into a plurality of segments such as 33, 34, and 35 associated with a first sensor; 43, 44, and 45 associated with a second sensor; 53, 54, and 55 associated with a third sensor; 63, 64, and 65 associated with a fourth sensor; and so on. These uncertainty boundaries for the object are propagated and decimated into a plurality of finer overlapping segments. As discussed below, each segment 33, 54, 65, etc., may be weighted with a probability measure, and a statistical combinatory approach is then preferably applied to more accurately identify the most likely position with a smaller uncertainty region 82 for object 30. This is one advantage of the preferred embodiment of the present invention. Another advantage is that an estimate of the path 88 being traversed by object 30, and the associated path uncertainty 89, may be more accurately determined.

Figure 4:
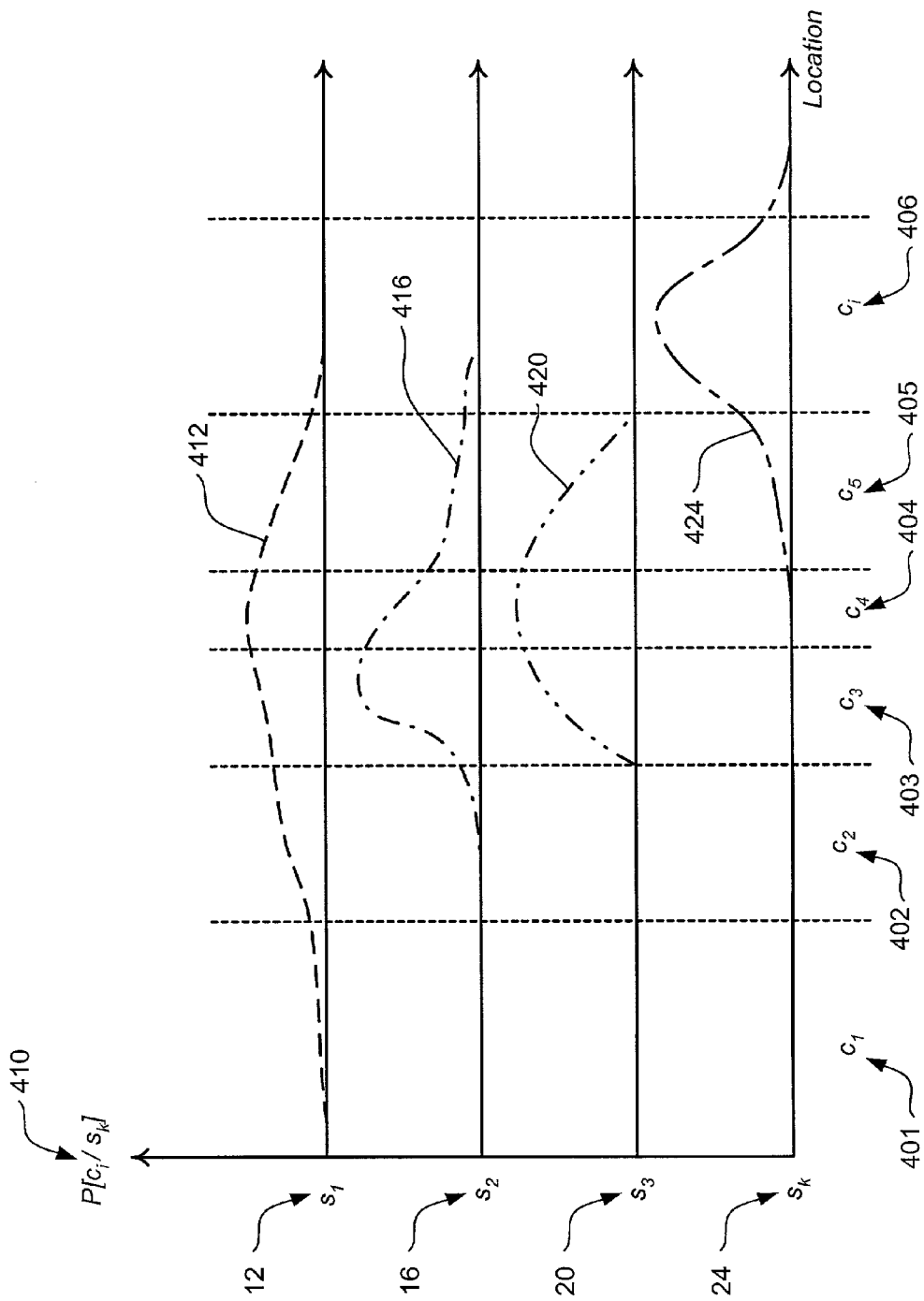
FIG. 4 is a chart illustrating the probability distributions of an object's location segmented into sub-ranges or classes.

For each sensor available for locating and tracking an object, a probability distribution may be determined based on the reported estimated position of the object and the performance characteristics of the sensor. As shown in FIG. 4, example curve 412 may represent the probability distribution of the estimated position of the object as determined by sensor 12. Likewise, example curve 416 may be the probability distribution of the estimated position of the object as determined by sensor 16. Example curve 420 may indicate the probability distribution of the estimated position of the object as determined by sensor 20, and example curve 424 may represent the probability distribution of the estimated position of the object as determined by sensor 24. As before, the four probability distributions corresponding to the four sensors are merely illustrative in nature.

The probability distributions are preferably segmented into sub-ranges or classes $c_1$ 401, $c_2$ 402, $c_3$ 403, etc. This segmentation results in a plurality of uncertainty boundaries for the estimated position of the object, and a probability value is preferably associated with each sub-range. It should be noted that for each sensor, every sub-range such as those illustrated in FIG. 4 may be represented by an uncertainty boundary in FIG. 3. Again, for illustration purposes, only three of the six sub-ranges from FIG. 4 are shown as uncertainty boundaries in FIG. 3 for each of the four illustrated sensors. It is desirable that the intersections of the plurality of segments result in new boundaries that indicate the probable area wherein the object may be located. These new boundaries may then be statistically evaluated to identify the class with the greatest likelihood of containing the object.

The probability analysis may be further extended to combine the quantitative data and qualitative information (e.g., symbolic, weather conditions, reliability of source, assumptions, performance history, etc.) to provide more accuracy in locating and tracking the object. For each identified sub-range of FIG. 4, all imposed assumptions and quantitative and qualitative indicators may be taken into consideration, and a probability measure reflective of the reliability of the sensor to sense the information is preferably assigned. In the prior art, a sensor's overall historic performance data may be extrapolated to obtain a trending indication of the sensor's reliability. However, in the preferred embodiment of the present invention, the extrapolation is preferably applied to each of the parameters (e.g., temperature, pressure, moisture level, visibility, etc.) that impact a sensor's reliability. By individually extrapolating on each parameter affecting a sensor's reliability, the overall estimation error may be reduced. An advantage of this approach is that it permits the combining of any and all types and forms of variables and parameters, collectively referred to as drivers, that can impact a sensor's reliability.

Figure 5:
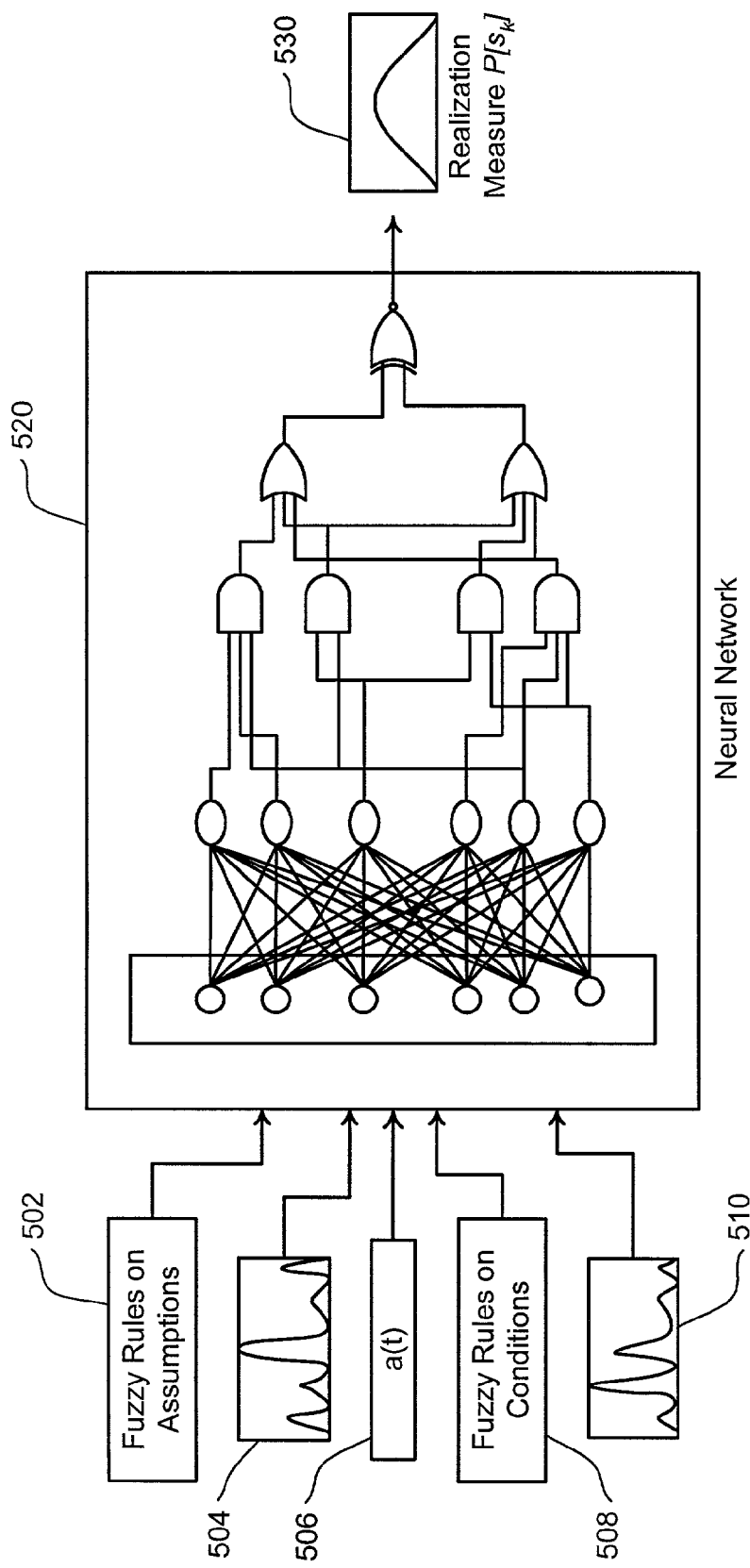
FIG. 5 is a schematic diagram showing a fuzzy logic neural network that may be used for analyzing qualitative data in accordance with the present invention.

As shown in FIG. 5, representative examples of drivers includes fixed known values, probable ranges 504 and 510, fuzzy logic based rules on qualitative environmental conditions 508, fuzzy logic based rules on assumptions effecting sensor's operational performance 502, functional expressions 506, etc. Known quantities may be specified as fixed values and uncertain parameters are preferably represented by probability distributions such as 504 and 510. The probability distribution 504, for example, may be representative of a best curve fit of historic data from the sensor, and the fuzzy rules on conditions 508, for example, may include qualitative information regarding the effect of environmental conditions (e.g., rain) on the accuracy of a reading from a sensor.

In one illustrative embodiment of the present invention shown in FIG. 5, all the defined drivers are preferably input to a neural network with multi-level perceptron 520 for estimating the nonlinear relationship between the driver's values and the sensor's reliability. Neural network 520 may be trained to determine the reliability measure, P[s], and the realization measure $P[s_k]$ 530, preferably indicative of the mean of the sensor reliability measure for a given class. Next, a simulation such as a Monte-Carlo approach for example, may be used to determine the statistical distribution for all possible ranges with the likelihood outcome for the senor reliability, and the conditional probability rule is preferably applied to compute the posteriori conditional probability distribution for each class $c_i$ $$P[c_i/s_k] = \frac{P[c_i, s_k]}{P[s_k]} \quad \text{Equation 1}$$

where, $P[c_i/s_k]$ is the conditional probability of class $c_i$ given that the measurement is from sensor k $P[c_i,s_k]$ is the intersection probability of sensor reading $s_k$ residing in class $c_i$ Lastly, a conjunctive fusion method, which provides an estimation of the intersections of the probability measures, is preferably applied to all parameters affecting sensor reliability to identify the class with the most likely probability of defining an object's position. For instance, an information class, $c_{io}$, may be depicted such that $$c_{io} = \underset{c_i}{\operatorname{argmax}} \left\{ \frac{f(P[c_i, s_1], \ldots, P[c_i, s_N])}{\max_j [f(P[c_j, s_1], \ldots, P[c_j, s_N])]} \right\} \quad \text{Equation 2}$$

where, in the ratio on the right hand side, the function in the numerator represents an intersection operator which takes into account the probability of all sensor readings, $s_1$ through $s_N$, located in class $c_i$, and the denominator is the maximum value of the intersection operator from all the classes.

The ratio on the right hand side of Equation 2 is preferably evaluated for each class, and the final attribute comes from the depicted class that maximizes the argument. All the qualitative information and assumptions are preferably included as part of this analysis, which strengthens its capabilities in possibly providing a better estimate of the object's position. In the event that sensor reliability may not be included (i.e., qualitative information is not fused), or may be assumed to be the same for all sensors, the conjunctive fusion method simplifies to:

$$c_{io} = \underset{c_i}{\operatorname{argmax}} \left\{ \frac{f(P[c_i/s_1], \ldots, P[c_i/s_N])}{\max_j [f(P[c_j/s_1], \ldots, P[c_j/s_N])]} \right\} \quad \text{Equation 3}$$

The foregoing discussion focused on a method and system of the preferred embodiment of the present invention for locating and tracking an object, such as an airborne aircraft, preferably using statistical analysis and probability theory for fusing (or aggregating) quantitative data and qualitative information from a plurality of sensors and sources. In considering alternate embodiments of the present invention, it may be convenient to refer to the above described preferred embodiment as a local fusion center or alternately as a local object locator. In another embodiment, a plurality of local fusion centers may be considered as a plurality of sensors reporting information on the position and probability distribution for a plurality of objects. In such an embodiment, the plurality of local object locators may transmit the plurality of object locations and probability distributions to a central (or global) fusion center for further locating and tracking of objects on a global basis.

In one illustrative embodiment, a site such as an airport, can be considered as having one or more local fusion centers for locating and tracking not only airborne aircraft, but also other objects such as service vehicles and aircraft on the tarmac. The plurality of local object locators at a site may be considered as providing location and probability distribution information to a site fusion center for that airport, which in turn may transmit relevant data to yet another fusion center possibly receiving data from other site fusion centers. Preferably, the lowest-most local fusion center may either transmit the fused data including object positions and probability distributions, and/or all the quantitative data and qualitative information received from its associated sensors.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A system to determine a most likely position of a moving inanimate object, said system comprising:
    a plurality of sensors each providing a location of the moving inanimate object with an associated sensor uncertainty distribution, wherein for each sensor, the associated sensor uncertainty distribution is dependent on one or more performance characteristics for the sensor; and
    a data processor configured to read location data from two or more sensors, wherein said data processor combines the location data and the associated sensor uncertainty distributions from said two or more sensors and generates a value indicative of the most likely position of the moving inanimate object, and further includes a set of fuzzy logic rules applied to the one or more performance characteristics of the sensors.

2. A system to determine a most likely position of a moving inanimate object, said system comprising:
    a plurality of sensors each providing a location of the moving inanimate object with an associated sensor uncertainty distribution, wherein for each sensor, the associated sensor uncertainty distribution is dependent on one or more performance characteristics for the sensor; and
    a data processor configured to read location data from two or more sensors, wherein said data processor combines the location data and the associated sensor uncertainty distributions from said two or more sensors and generates a value indicative of the most likely position of the moving inanimate object, and further includes a set of fuzzy logic rules applied to one or more parameters that affect the one or more performance characteristics and/or the sensor uncertainty distribution.

3. A system to determine a most likely position of a moving inanimate object, said system comprising:
    a plurality of sensors each providing a location of the moving inanimate object with an associated sensor uncertainty distribution, wherein for each sensor, the associated sensor uncertainty distribution is dependent on one or more performance characteristics for the sensor; and a data processor configured to read location data from two or more sensors, wherein said data processor combines the location data and the associated sensor uncertainty distributions from said two or more sensors and generates a value indicative of the most likely position of the moving inanimate object, and further including a neural network applied to the one or more performance characteristics of the sensors.

4. A system to determine a most likely position of a moving inanimate object, said system comprising:

a plurality of sensors each providing a location of the moving inanimate object with an associated sensor uncertainty distribution, wherein for each sensor, the associated sensor uncertainty distribution is dependent on one or more performance characteristics for the sensor;

a data processor configured to read location data from two or more sensors, wherein said data processor combines the location data and the associated sensor uncertainty distributions from said two or more sensors and generates a value indicative of the most likely position of the moving inanimate object, and further including a neural network applied to one or more parameters that affect the one or more performance characteristics and/or the sensor uncertainty distribution.

5. A system to determine a most likely position of a moving inanimate object, said system comprising:

a plurality of sensors each providing a location of the moving inanimate object with an associated sensor uncertainty distribution; and a data processor configured to read location data from two or more sensors, wherein said data processor combines the location data and the associated sensor uncertainty distributions from said two or more sensors and generates a value indicative of the most likely position of the moving inanimate object, and further including a neural network trained for determining a sensor reliability measure.

6. A system to determine a most likely position of a moving inanimate object, said system comprising:

a plurality of sensors each providing a location of the moving inanimate object with an associated sensor uncertainty distribution; and a data processor configured to read location data from two or more sensors, wherein said data processor combines the location data and the associated sensor uncertainty distributions from said two or more sensors and generates a value indicative of the most likely position of the moving inanimate object, and further including a neural network trained for determining a realization measure indicative of the mean of the sensor reliability measure.

7. A system to determine a most likely position of a moving inanimate object, said system comprising:

a plurality of sensors each providing a location of the moving inanimate object with an associated sensor uncertainty distribution;

a data processor configured to read location data from two or more sensors, wherein said data processor combines the location data and the associated sensor uncertainty distributions from said two or more sensors and generates a value indicative of the most likely position of the moving inanimate object;

wherein the data processor is configured to determine a probability distribution for a position of the object based on the location data and the associated sensor uncertainty distribution from each of the at least two sensors, and wherein each probability distribution for the position of the object is segmented into a plurality of sub-ranges, and wherein parameters affecting sensor uncertainties are manipulated by a conditional probability rule to determine a posteriori conditional probability distribution for each sub-range.

* * * * *